US012613207B2

(12) United States Patent
Akimoto et al.

(10) Patent No.: US 12,613,207 B2
(45) Date of Patent: Apr. 28, 2026

(54) SENSOR AND SENSOR SYSTEM

(71) Applicant: KABUSHIKI KAISHA TOSHIBA, Tokyo (JP)

(72) Inventors: Yosuke Akimoto, Yokohama (JP); Akira Fujimoto, Kawasaki (JP); Yoshihiko Kurui, Chigasaki (JP); Ping Wang, Fujisawa (JP); Hiroaki Yamazaki, Yokohama (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 326 days.

(21) Appl. No.: 18/354,802

(22) Filed: Jul. 19, 2023

(65) Prior Publication Data

US 2024/0295513 A1     Sep. 5, 2024

(30) Foreign Application Priority Data

Mar. 2, 2023     (JP) ................................. 2023-032014

(51) Int. Cl.
  *G01N 27/18*      (2006.01)
  *G01N 27/04*      (2006.01)
(52) U.S. Cl.
  CPC .................................... G01N 27/04 (2013.01)
(58) Field of Classification Search
  CPC ...... G01N 27/04; G01N 27/18; G01N 27/048; G01N 27/06

USPC ............. 73/23.3, 23.31, 23.34, 25.01, 25.03, 73/25.05, 335.05, 31.01, 31.02, 31.05, 73/31.06, 54.42, 61.46; 338/36; 374/45
See application file for complete search history.

(56) References Cited

FOREIGN PATENT DOCUMENTS

| | | | |
|---|---|---|---|
| EP | 3 534 154 A1 | 9/2019 | |
| JP | 2004219403 A * | 8/2004 | ......... G01N 27/4074 |
| JP | 2017-36935 A | 2/2017 | |
| JP | 2019-152451 A | 9/2019 | |

* cited by examiner

*Primary Examiner* — Robert R Raevis
(74) *Attorney, Agent, or Firm* — Finnegan, Henderson, Farabow, Garrett & Dunner, LLP

(57)     ABSTRACT

According to one embodiment, a sensor includes an element section including a first base and a first element. The first element includes a first fixed member fixed to the first base, a first connecting member supported by the first fixed member, and a first film portion supported by the first connecting member. A first gap is provided between the first base and the first film portion. The first film portion includes a first resistance layer, a first conductive layer, and a first conductive member. The first resistance layer does not overlap the first conductive layer in a first direction from the first base to the first fixed member. The first conductive member overlaps the first resistance layer and the first conductive layer in the first direction. A first electrical resistance of the first resistance layer changes according to a state of a detection target around the first element.

20 Claims, 5 Drawing Sheets

SENSOR AND SENSOR SYSTEM

CROSS-REFERENCE TO RELATED APPLICATIONS

This application is based upon and claims the benefit of priority from Japanese Patent Application No. 2023-032014, filed on Mar. 2, 2023; the entire contents of which are incorporated herein by reference.

FIELD

Embodiments described herein relate generally to a sensor and a sensor system.

BACKGROUND

For example, there are sensors that detect gases. It is desired to improve the characteristics of the sensor.

DETAILED DESCRIPTION

Figure 1:
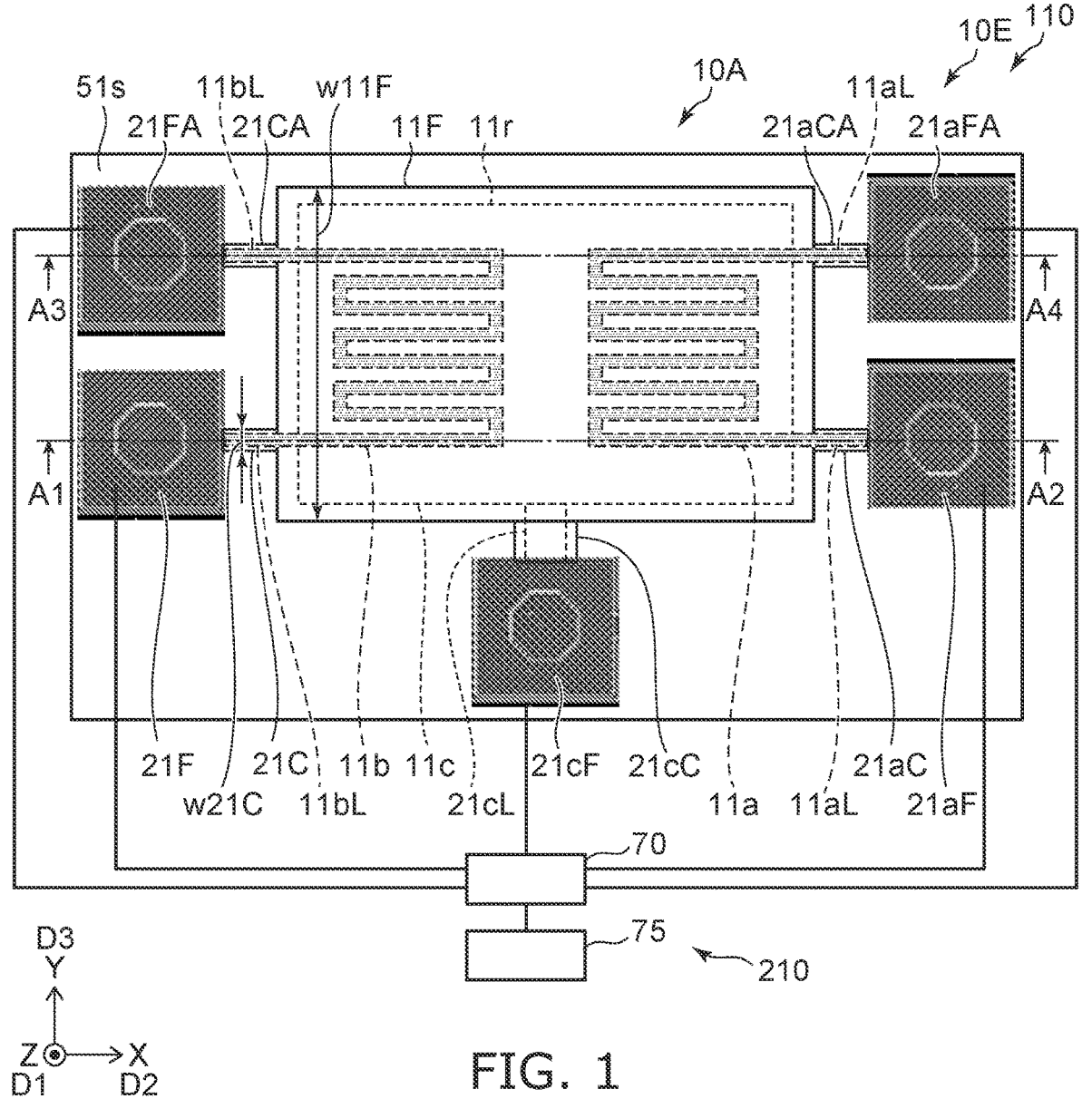
FIG. 1 is a schematic plan view illustrating a sensor according to a first embodiment.

According to one embodiment, a sensor includes an element section including a first base and a first element. The first element includes a first fixed member fixed to the first base, a first connecting member supported by the first fixed member, and a first film portion supported by the first connecting member. A first gap is provided between the first base and the first film portion. The first film portion includes a first resistance layer, a first conductive layer, and a first conductive member. The first resistance layer does not overlap the first conductive layer in a first direction from the first base to the first fixed member. The first conductive member overlaps the first resistance layer and the first conductive layer in the first direction. A first electrical resistance of the first resistance layer is configured to change according to a state of a detection target around the first element.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic plan view illustrating a sensor according to a first embodiment.

Figure 2A:
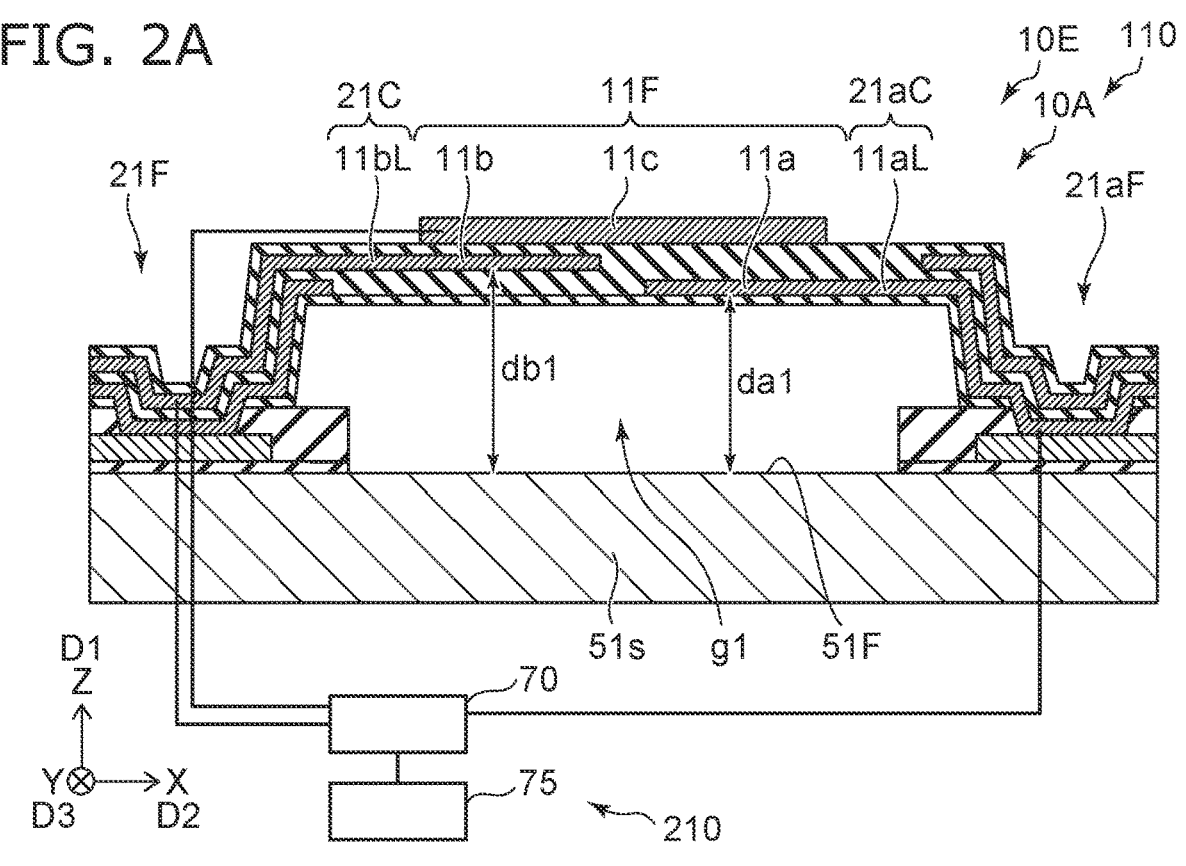
FIGS. 2A and 2B are schematic cross-sectional views illustrating the sensor according to the first embodiment.
Figure 2B:
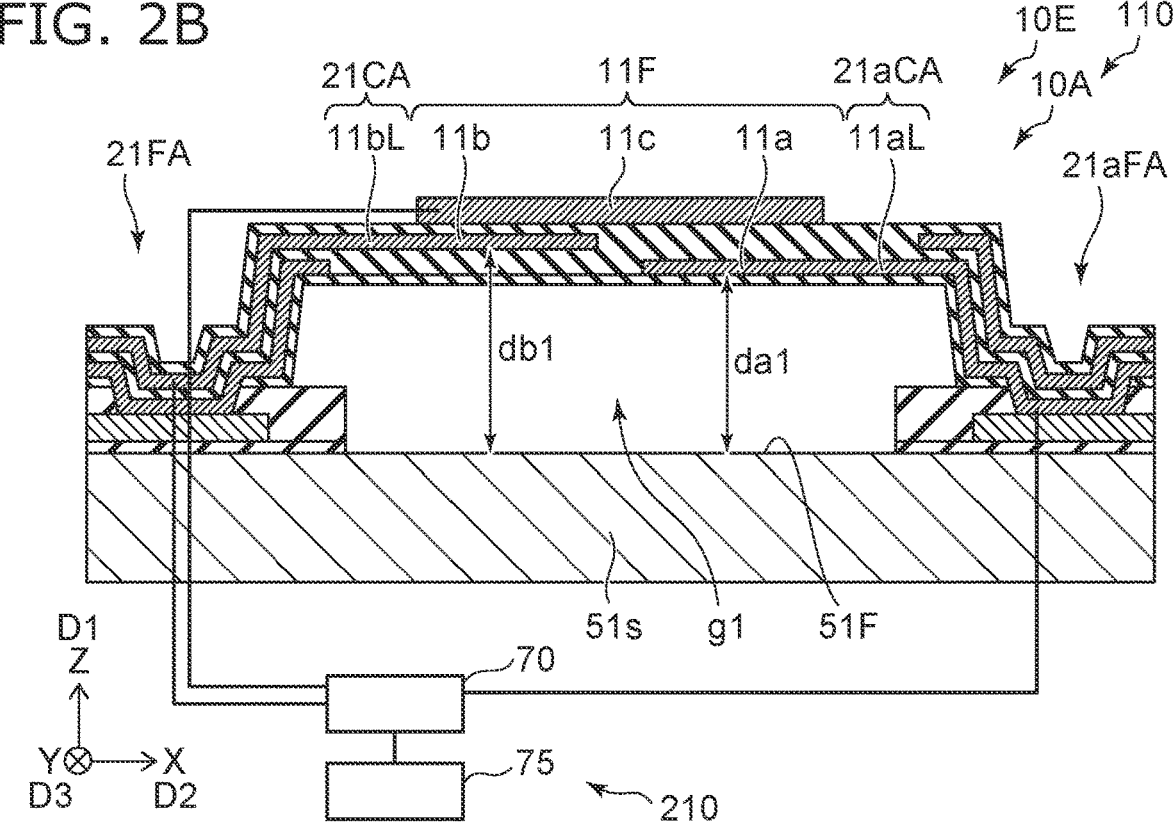

FIGS. 2A and 2B are schematic cross-sectional views illustrating the sensor according to the first embodiment.

FIG. 2A is a cross-sectional view taken along the line A1-A2 in FIG. 1. FIG. 2B is a cross-sectional view taken along the line A3-A4 of FIG. 1.

As shown in FIGS. 1, 2A and 2B, a sensor 110 according to the embodiment includes an element section 10E. The element section 10E includes a first base 51s and a first element 10A.

The first base 51s may include, for example, a silicon substrate. The first base 51s may include electronic circuits such as transistors.

The first element 10A includes a first fixed member 21F fixed to the first base 51s, a first connecting member 21C supported by the first fixed member 21F, and a first film portion 11F supported by the first connecting member 21C.

A first gap g1 is provided between the first base 51s and the first film portion 11F. A first direction D1 from the first base 51s to the first fixed member 21F is defined as a Z-axis direction. One direction perpendicular to the Z-axis direction is defined as an X-axis direction. A direction perpendicular to the Z-axis direction and the X-axis direction is defined as a Y-axis direction.

The first base 51s includes a first face 51F. The first face 51F extends along the X-Y plane. The first fixed member 21F is fixed to the first face 51F.

The first film portion 11F includes a first resistance layer 11a, a first conductive layer 11b, and a first conductive member 11c. The first resistance layer 11a does not overlap the first conductive layer 11b in the first direction D1. The first conductive member 11c overlaps the first resistance layer 11a and the first conductive layer 11b in the first direction D1.

By the first resistance layer 11a, which does not overlap the first conductive layer 11b, for example, electromagnetic coupling between the first resistance layer 11a and the first conductive layer 11b is suppressed.

The first electrical resistance R1 of the first resistance layer 11a changes depending on a state of the detection target around the first element 10A.

As shown in FIG. 1, in the sensor 110, a controller 70 may be provided. The controller 70 may be included in the sensor 110. The controller 70 may be provided separately from the sensor 110. The controller 70 is configured to supply a first electric power to the first conductive layer 11b and to detect the first electrical resistance R1. The supply of the first electric power raises the temperature of the first film portion 11F. By the first conductive member 11c overlapping the first resistance layer 11a and the first conductive layer 11b, the heat of the first conductive layer 11b is efficiently transmitted to the first resistance layer 11a. The first conductive member 11c functions as a heat conductor.

The heat of the first film portion 11F, for example, propagates from the first film portion 11F to its surroundings. A part of the heat propagates to the first base 51s through the first gap g1. Another part of the heat propagates upward through the first film portion 11F. The first conductive member 11c may function as a radiator.

For example, the heat propagation (heat dissipation) changes according to the state of the detection target around the first element 10A. The detection target is, for example, a gas. For example, the thermal conductivity of the gas around the first element 10A depends on the elements (and/or molecules) included in the gas and their concentration. The heat dissipation property changes depending on the state of the detection target (type and concentration of gas), and as a result, the first electrical resistance R1 of the first resistance layer 11a changes. By detecting the first electrical resistance R1, it is possible to detect the state of the detection target (gas and change in concentration of gas).

Thus, in the embodiment, the first electrical resistance R1 changes depending on the state of the detection target when the temperature of the first film portion 11F is raised by the first electric power supplied to the first conductive layer 11b.

The detection target exists in the first gap g1. The first electrical resistance R1 changes depending on the state of the detection target between the first base 51s and the first film portion 11F.

In such a sensor 110, it has been found that the signal obtained from the first resistance layer 11a (the signal corresponding to the first electrical resistance R1) tends to include noise when the first resistance layer 11a overlaps the first conductive layer 11b. For example, for rising the temperature, a large current is supplied to the first conductive layer 11b. It is considered that noise included in the large current causes the noise in the signal obtained from the first resistance layer 11a.

In the embodiment, the first resistance layer 11a and the first conductive layer 11b are provided so as not to overlap each other in the first direction D1. Thereby, coupling is suppressed and the noise is suppressed. By providing the first conductive member 11c, the temperature of the first resistance layer 11a can be raised efficiently and uniformly. The noise is suppressed in the signal obtained from the first resistance layer 11a. As a result, the detection target can be detected with high accuracy. According to the embodiment, it is possible to provide a sensor capable of improving characteristics.

The potential of the first conductive member 11c may be fixed. The potential of the first conductive member 11c is, for example, fixed to the ground potential. Thereby, the influence on the first resistance layer 11a from the first conductive layer 11b via the first conductive member 11c can be further suppressed. The noise can be suppressed more. The first conductive member 11c whose potential is fixed functions as a shield. The detection targets can be detected with higher accuracy.

In the embodiment, for example, a first conductive layer current flowing through the first conductive layer 11b in the supply of the first electric power is large. Thereby, the first film portion 11F can be effectively heated. On the other hand, a first resistance layer current flowing through the first resistance layer 11a in the detecting the first electrical resistance R1 is relatively small. For example, the first conductive layer current is greater than the first resistance layer current.

The noise is likely to occur when the first conductive layer current is greater than the first resistance layer current. In the embodiment, even in such a state where the noise is likely to occur, the noise can be effectively suppressed by not overlapping the first resistance layer 11a and the first conductive layer 11b.

For example, the first conductive layer current is not less than 2 times the first resistance layer current. For example, the first conductive layer current may be not less than 5 times the first resistance layer current.

The first conductive member 11c may be electrically connected to the first base 51s. A first base potential of the first base 51s may be substantially the same as the potential of the first conductive member 11c.

As shown in FIG. 2A, in this example, a distance da1 along the first direction D1 between the first base 51s and the first resistance layer 11a is shorter than a distance db1 along the first direction D1 between the first base 51s and the first conductive layer 11b. The first resistance layer 11a and the first conductive layer 11b are located between the first base 51s and the first conductive member 11c. The first conductive layer 11b spreads heat easily to the first conductive member 11c by proximity, for example. The first resistance layer 11a easily detects the change of the gas in the first gap g1 by proximity in the first gap g1. As will be described below, the distance da1 may be substantially the same as the distance db1.

In the embodiments, the electrical resistance of the first conductive layer 11b may be lower than the electrical resistance of the first resistance layer 11a. Efficient heating can be achieved by the first conductive layer 11b.

The material of the first conductive layer 11b may be substantially the same as the material of the first resistance layer 11a. For example, the first conductive layer 11b and the first resistance layer 11a may include at least one selected from the group consisting of Au, Al, Ti, TiN and Pt.

As shown in FIG. 1, a part of the first conductive member 11c overlaps the first conductive layer 11b and the first resistance layer 11a in the first direction D1. Another part of the first conductive member 11c does not overlap the first conductive layer 11b and the first resistance layer 11a in the first direction D1. For example, in a plane (X-Y plane) crossing the first direction D1, at least a part of the outer edge 11r of the first conductive member 11c is outside the first conductive layer 11b and the first resistance layer 11a. For example, the area of the first conductive member 11c is larger than the area of the first conductive layer 11b and larger than the area of the first resistance layer 11a. By such a first conductive member 11c, temperature of the first film portion 11F becomes more uniform.

As shown in FIG. 1, the first connecting member 21C extends along a second direction D2. The second direction D2 crosses the first direction D1. A width of the first connecting member 21C in a third direction D3 is defined as a first connecting member width w21C. The third direction D3 crosses a plane including the first direction D1 and the second direction D2. A width of the first film portion 11F in the third direction D3 is defined as a first film portion width w11F. The first connecting member width w21C is narrower than the first film portion width w11F. Thereby, it is possible to suppress the heat of the first film portion 11F from propagating through the first connecting member 21C. The temperature of the film can be raised with low energy consumption.

As shown in FIG. 1 and FIG. 2B, the first element 10A includes a first other fixed member 21FA fixed to the first base 51s and a first other connecting member 21CA supported by the first other fixed member 21FA. The first other connecting member 21CA supports the first film portion 11F. A first conductive layer wiring 11bL electrically connected to the first conductive layer 11b passes through the first connecting member 21C and the first other connecting member 21CA. The controller 70 may be electrically connected to the first conductive layer 11b via the first conductive layer wiring 11bL.

As shown in FIG. 1, FIG. 2A and FIG. 2B, the first element 10A may further include a first resistance fixed member 21aF fixed to the first base 51s, a first resistance connecting member 21aC supported by the first resistance fixed member 21aF, a first other resistance fixed member 21aFA fixed to the first base 51s, and a first other resistance connecting member 21aCA supported by the first other resistance fixed member 21aFA.

The first resistance connecting member 21aC and the first other resistance connecting member 21aCA support the first film portion 11F. The first resistance layer wiring 11aL electrically connected to the first resistance layer 11a passes through the first resistance connecting member 21aC and the first other resistance connecting member 21aCA. The controller 70 may be electrically connected to the first resistance layer 11a via the first resistance layer wiring 11aL.

As shown in FIG. 1, the first element 10A may further include a first conductive fixed member 21cF fixed to the first base 51s and a first conductive connecting member 21cC supported by the first conductive fixed member 21cF. The first conductive connecting member 21cC supports the first film portion 11F. The first conductive member wiring 21cL electrically connected to the first conductive member 11c extends along the first conductive connecting member 21cC. The first conductive member 11c may be set to a fixed potential via the first conductive member wiring 21cL.

Figure 3A:
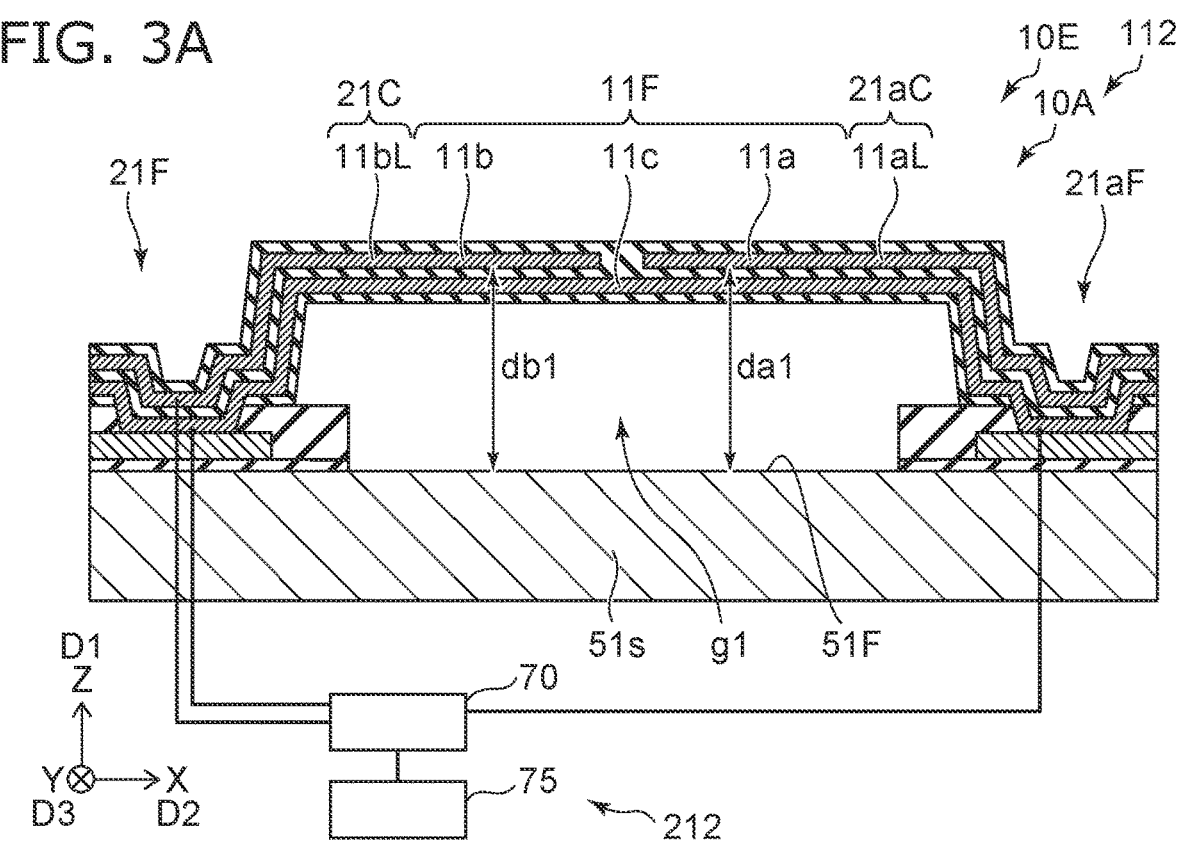
FIGS. 3A and 3B are schematic cross-sectional views illustrating a sensor according to the first embodiment.
Figure 3B:
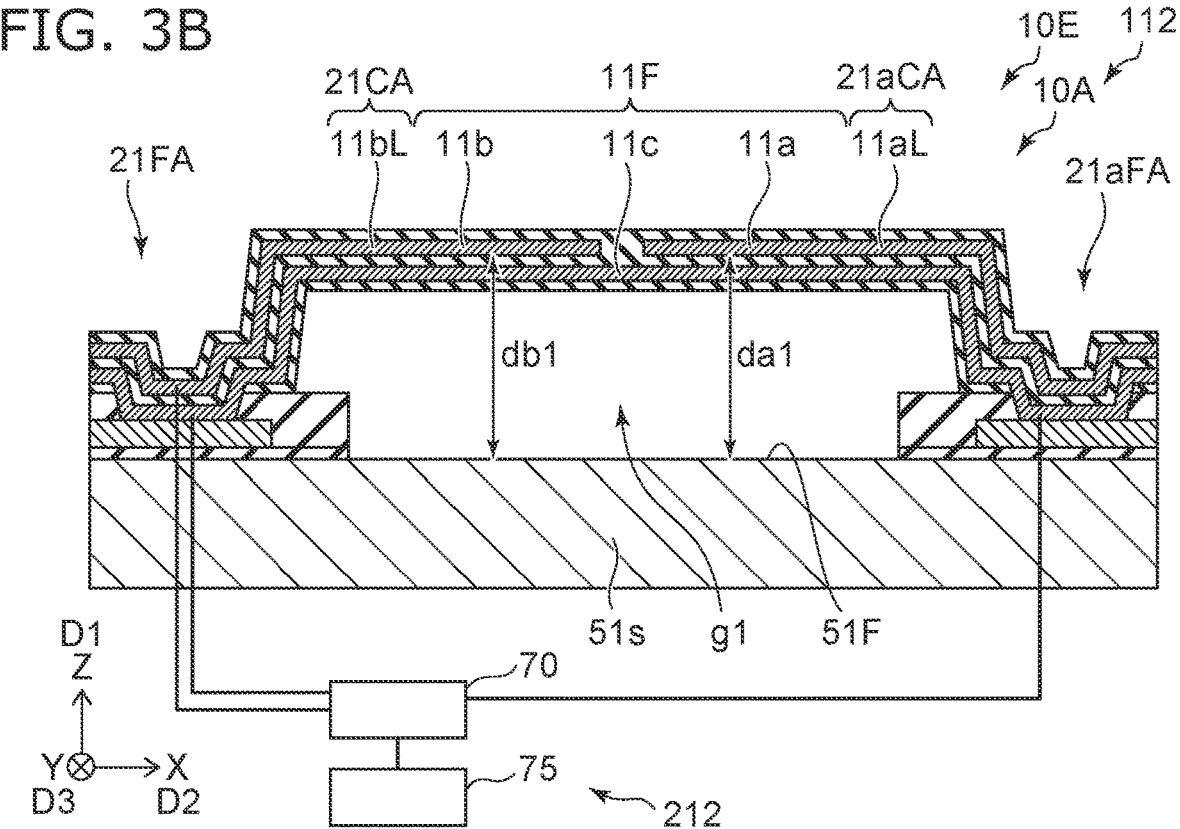

FIGS. 3A and 3B are schematic cross-sectional views illustrating a sensor according to the first embodiment.

FIGS. 3A and 3B are cross-sectional views corresponding to the line A1-A2 and the line A3-A4 of FIG. 1.

As shown in FIGS. 3A and 3B, in a sensor 112 according to the embodiment, the first conductive member 11c is located between the first base 51s and the first resistance layer 11a, and between the first base 51s and the first conductive layer 11b. Except for this, the configuration of the sensor 112 may be the same as the configuration of the sensor 110.

By providing the first conductive member 11c between the first base 51s and the first resistance layer 11a and between the first base 51s and the first conductive layer 11b, for example, the number of wiring layers can be reduced, and the manufacturing becomes easy.

Figure 4A:
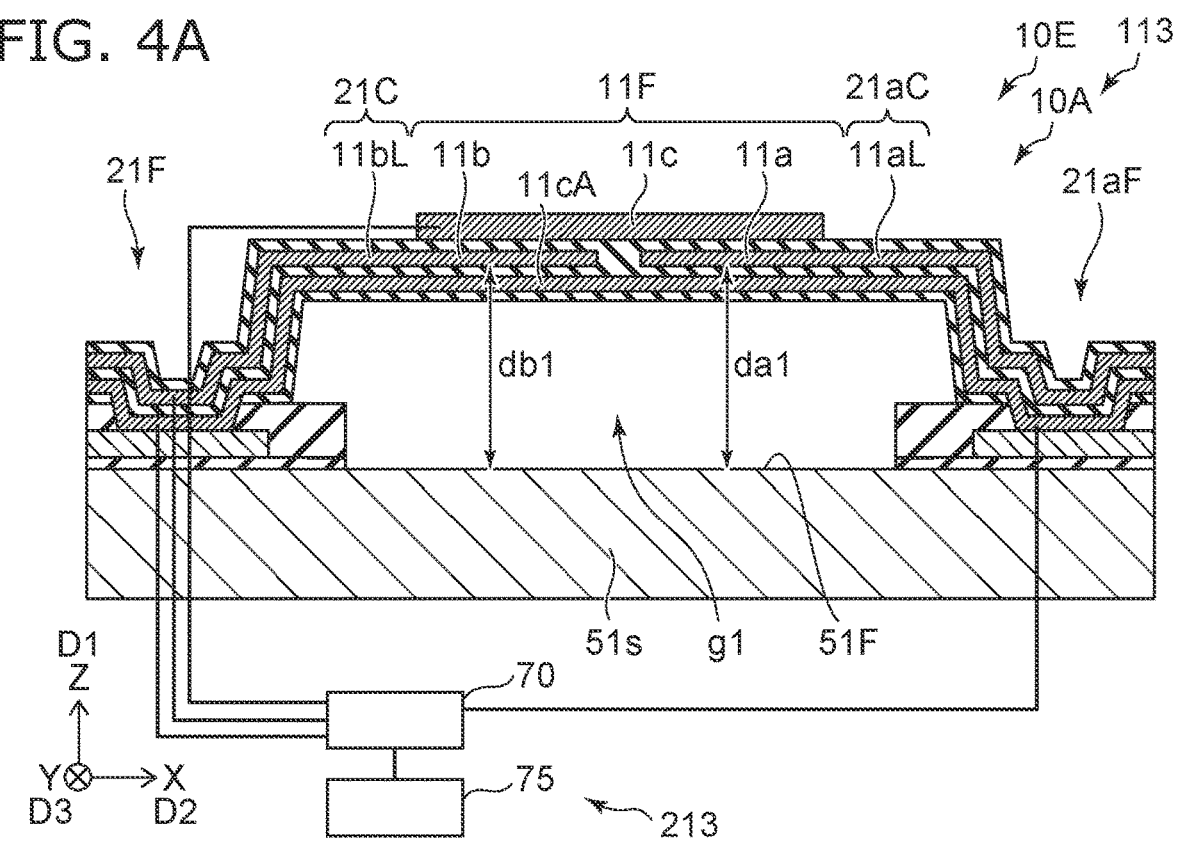
FIGS. 4A and 4B are schematic cross-sectional views illustrating a sensor according to the first embodiment.
Figure 4B:
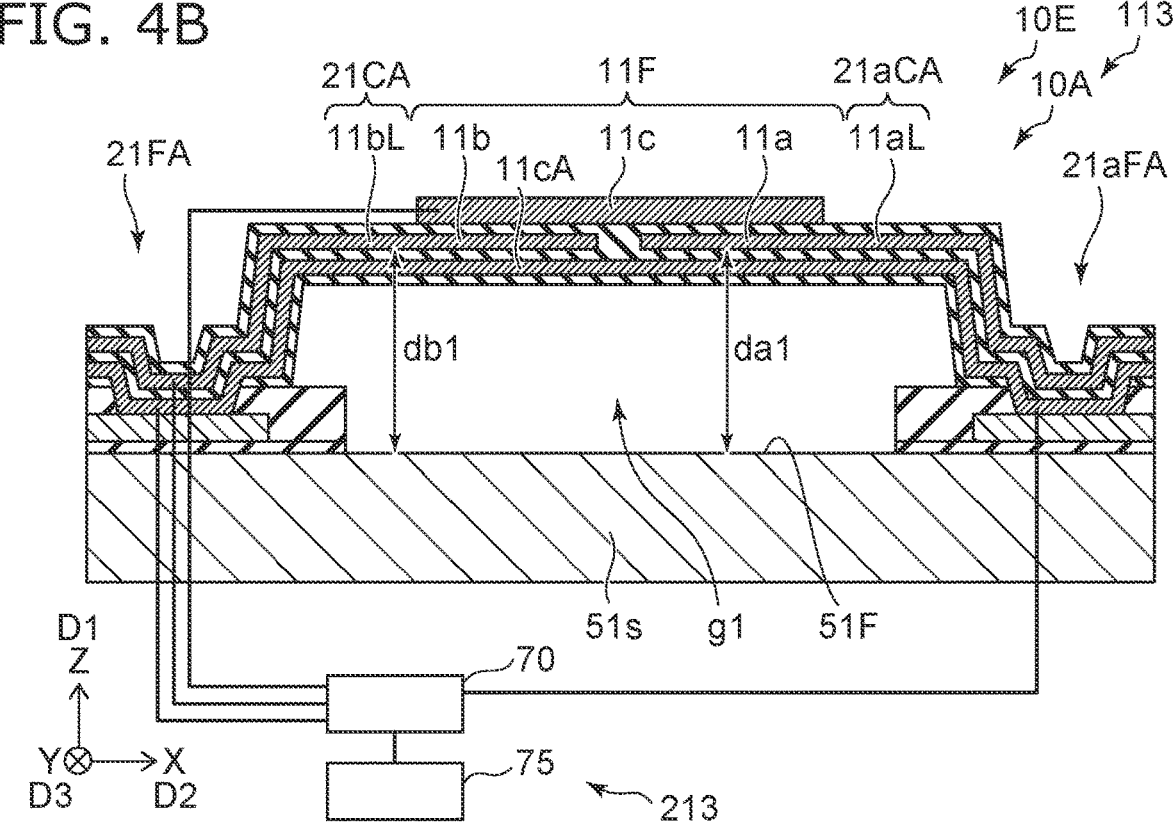

FIGS. 4A and 4B are schematic cross-sectional views illustrating a sensor according to the first embodiment.

FIGS. 4A and 4B are cross-sectional views corresponding to the line A1-A2 and the line A3-A4 in FIG. 1.

As shown in FIGS. 4A and 4B, in a sensor 113 according to the embodiment, the first film portion 11F further includes a first other conductive member 11cA. Except for this, the configuration of the sensor 113 may be the same as the configuration of the sensor 110.

In the sensor 113, the first other conductive member 11cA overlaps the first resistance layer 11a and the first conductive layer 11b in the first direction D1. The first resistance layer 11a and the first conductive layer 11b are provided between the first conductive member 11c and the first other conductive member 11cA.

For example, the potentials of the first conductive member 11c and the first other conductive member 11cA are fixed. The potentials of the first conductive member 11c and the first other conductive member 11cA may be electrically connected to the first base 51s. The first other conductive member 11cA has, for example, a function of a ground plane. The first conductive member 11c has, for example, a function of a ground plane and the function of a radiator. The noise can be suppressed more. Detection with higher accuracy becomes possible.

Figure 5:
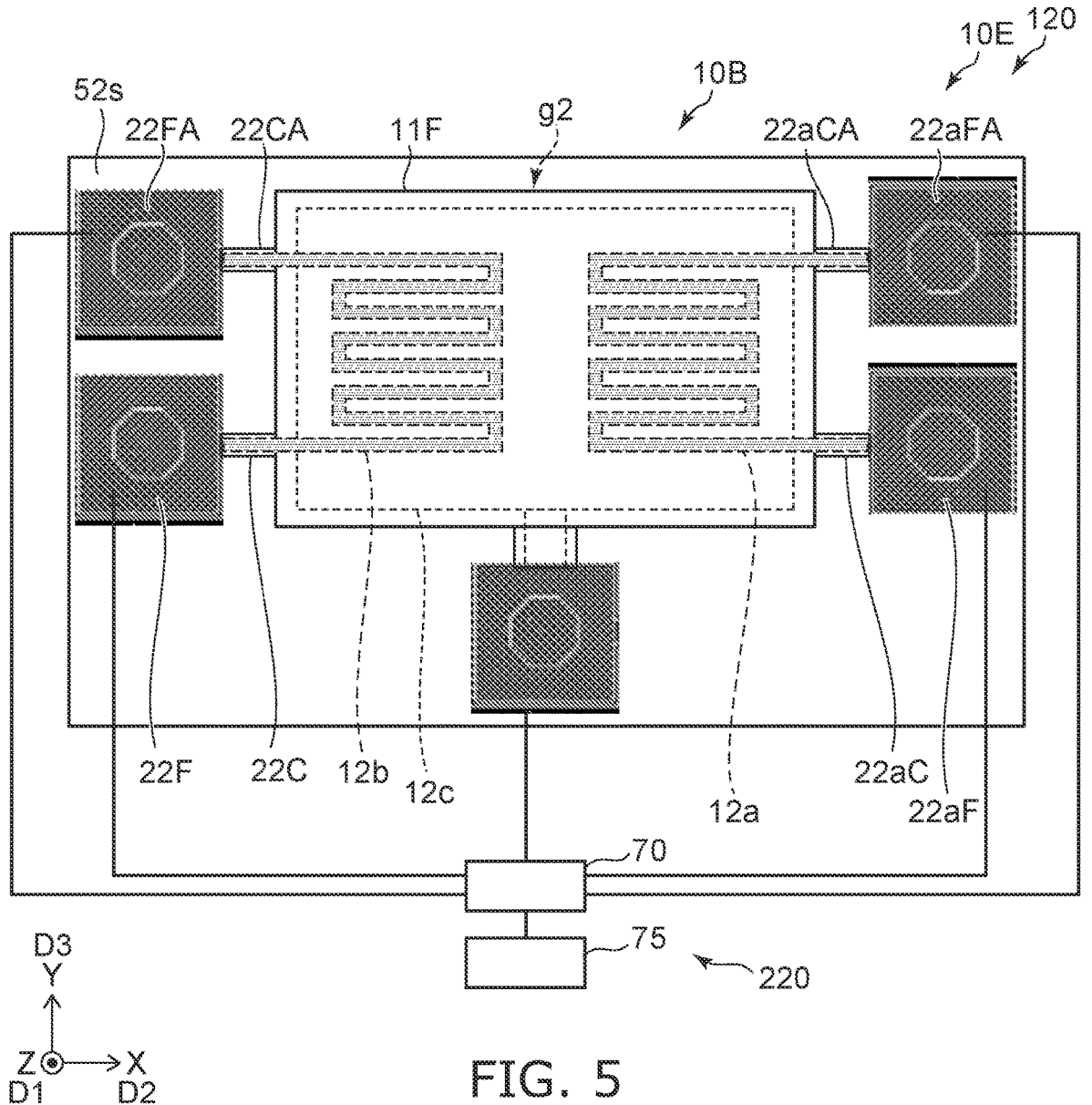
FIG. 5 is a schematic plan view illustrating a part of a sensor according to the first embodiment.

FIG. 5 is a schematic plan view illustrating a part of a sensor according to the first embodiment.

As shown in FIG. 5, in a sensor 120 according to the embodiment, the element section 10E includes a second base 52s and a second element 10B in addition to the first base 51s and the first element 10A (omitted in FIG. 5) described with respect to FIG. 1. In the sensor 120, the configuration of the first base 51s and the first element 10A may be the same as those in the sensor 110.

The second element 10B includes a second fixed member 22F fixed to the second base 52s, a second connecting member 22C supported by the second fixed member 22F, and a second film portion 12F supported by the second connecting member 22C. The second base 52s may be continuous with the first base 51s. The boundary between the second base 52s and the first base 51s may be clear or unclear.

A second gap g2 is provided between the second base 52s and the second film portion 12F. The second film portion 12F includes a second resistance layer 12a. The controller 70 is configured to output a value corresponding to a difference between the second electrical resistance R2 of the second resistance layer 12a and the first electrical resistance R1 (see FIG. 1). The controller 70 includes, for example, a differential amplifier.

The second element 10B is, for example, a reference element. For example, influences such as fluctuations in ambient temperature are suppressed. Higher accuracy detection is possible.

In this example, the second film portion 12F includes a second conductive layer 12b. Power need not be supplied to the second conductive layer 12b. The second conductive layer 12b may not be used for the detection.

In this example, the second film portion 12F includes a second conductive member 12c. The second conductive member 12c overlaps, for example, the second resistance layer 12a and the second conductive layer 12b. For example, the potential of the second conductive member 12c may be fixed. By the second conductive member 12c, the temperature of the second film portion 12F is made uniform.

In the embodiment, the second conductive layer 12b and the second conductive member 12c may be omitted. Alternatively, the configuration of the second element 10B may be substantially the same as the configuration of the first element 10A. The first element 10A and the second element 10B have substantially the same heat capacity and the like, which enables detection with higher accuracy.

In the sensor 120, the second element 10B may further include a second other fixed member 22FA fixed to the second base 52s, and a second other connecting member 22CA supported by the second other fixed member 22FA. The second other connecting member 22CA supports the second film portion 12F. The second film portion 12F is supported more stably. Power may be supplied to the second conductive layer 12b via the second connecting member 22C and the second other connecting member 22CA.

In the sensor 120, the second element 10B may further include a second resistance fixed member 22aF fixed to the second base 52s, a second resistance connecting member 22aC supported by the second resistance fixed member 22aF, a second resistance fixed member 22aFA fixed to the second base 52s, and a second resistance connecting member 22aCA supported by the second resistance fixed member 22aFA.

The second resistance connecting member 22aC and the second other resistance connecting member 22aCA support the second film portion 12F. The second electrical resistance R2 of the second resistance layer 12a may be detected via the second resistance connecting member 22aC and the second other resistance connecting member 22aCA.

Second Embodiment

The second embodiment relates to a sensor system. As shown in FIGS. 1 to 5, sensor systems 210, 212, 213, and 220 according to embodiments include sensors according to embodiments (sensors 110, 112, 113, and 120) and a communicator 75. The communicator 75 is configured to transmit a signal corresponding to the change in the first electrical resistance R1. According to embodiments, low noise sensor signals can be obtained from a remote location.

The communicator 75 is configured to supply signals to the outside, for example, by at least one of wired or wireless methods. The communicator 75 may be configured to acquire control signals from the outside. The controller 70 may be controlled by the control signal from the outside.

The embodiments may include the following configurations (for example, technical proposals).

Configuration 1

A sensor, comprising:

an element section including a first base and a first element, the first element including a first fixed member fixed to the first base, a first connecting member supported by the first fixed member, and a first film portion supported by the first connecting member, a first gap being provided between the first base and the first film portion, the first film portion including a first resistance layer, a first conductive layer, and a first conductive member, the first resistance layer not overlapping the first conductive layer in a first direction from the first base to the first fixed member, the first conductive member overlapping the first resistance layer and the first conductive layer in the first direction, a first electrical resistance of the first resistance layer being configured to change according to a state of a detection target around the first element.

Configuration 2

The sensor according to Configuration 1, wherein in a state in which a temperature of the first film portion is raised by a first electric power supplied to the first conductive layer, the first electrical resistance is configured to change depending on the state of the detection target.

Configuration 3

The sensor according to Configuration 1 or 2, wherein the first electrical resistance changes according to the state of the detection target between the first base and the first film portion.

Configuration 4

The sensor according to any one of Configurations 1-3, wherein a distance between the first base and the first resistance layer along the first direction is shorter than a distance between the first base and the first conductive layer along the first direction.

Configuration 5

The sensor according to any one of Configurations 1-3, wherein a distance between the first base and the first resistance layer along the first direction is substantially the same as a distance between the first base and the first conductive layer along the first direction.

Configuration 6

The sensor according to any one of Configurations 1-5, wherein the first film portion further includes a first other conductive member, the first other conductive member overlaps the first resistance layer and the first conductive layer in the first direction, and the first resistance layer and the first conductive layer are provided between the first conductive member and the first other conductive member.

Configuration 7

The sensor according to any one of Configurations 1-6, wherein the first conductive member is electrically connected to the first base.

Configuration 8

The sensor according to any one of Configurations 1-7, wherein a first base potential of the first base is substantially the same as a potential of the first conductive member.

Configuration 9

The sensor according to any one of Configurations 1-8, wherein an electrical resistance of the first conductive layer is lower than an electrical resistance of the first resistance layer.

Configuration 10

The sensor according to any one of Configurations 1-9, wherein at least one of the first conductive layer or the first resistance layer includes at least one selected from the group consisting of Au, Al, Ti, TiN and Pt.

Configuration 11

The sensor according to any one of Configurations 1-10, wherein a part of the first conductive member overlaps the first conductive layer and the first resistance layer in the first direction, and another part of the first conductive member does not overlap the first conductive layer and the first resistance layer in the first direction.

Configuration 12

The sensor according to any one of Configurations 1-11, wherein in a plane crossing the first direction, at least a part of the outer edge of the first conductive member is outside the first conductive layer and the first resistance layer.

Configuration 13

The sensor according to any one of Configurations 1-12, wherein the first connecting member extends along a second direction crossing the first direction, and a first connecting member width of the first connecting member in a third direction crossing a plane including the first direction and the second direction is narrower than a first film portion width of the first film portion in the third direction.

Configuration 14

The sensor according to any one of Configurations 1-13, wherein the first element further includes a first other fixed member fixed to the first base, and a first other connecting member supported by the first other fixed member, the first other connecting member supports the first film portion, and a first conductive layer wiring electrically connected to the first conductive layer passes through the first connecting member and the first other connecting member.

Configuration 15

The sensor according to any one of Configurations 1-14, wherein the first element further includes a first resistance fixed member fixed to the first base, a first resistance connecting member supported by the first resistance fixed member, a first resistance fixed member fixed to the first base, and a first resistance connecting member supported by the first resistance fixed member, the first resistance connecting member and the first other resistance connecting member support the first film portion, and a first resistance layer wiring electrically connected to the first resistance layer passes through the first resistance connecting member and the first other resistance connecting member.

Configuration 16

The sensor according to any one of Configurations 1-15, wherein the first element further includes a first conductive fixed member fixed to the first base, and a first conductive connecting member supported by the first conductive fixed member.

Configuration 17

The sensor according to Configuration 2, further comprising:

a controller, the controller being configured to supply a first electric power to the first conductive layer, and the controller being configured to output a signal corresponding to the first electrical resistance.

Configuration 18

The sensor according to Configuration 17, wherein a first conductive layer current through the first conductive layer in a supplying the first electric power is larger than a first resistance layer current flowing through the first resistance layer in a detecting the first electrical resistance.

Configuration 19

The sensor according to Configuration 17 or 18, wherein the element section further includes a second base and a second element, the second element includes a second fixed member fixed to the second base, a second connecting member supported by the second fixed member, and a second film portion supported by the second connecting member, a second gap is provided between the second base and the second film portion, the second film portion includes a second resistance layer, and the controller is configured output a value corresponding to a difference between a second electrical resistance of the second resistance layer and the first electrical resistance.

Configuration 20

A sensor system, comprising:

the sensor according to Configuration 1; and a communicator configured to transmit a signal corresponding to the change in the first electrical resistance.

According to the embodiment, a sensor and a sensor system capable of improving characteristics can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors and sensor systems such as, bases, element sections, fixed members, connecting members, film portions, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and all sensor systems practicable by an appropriate design modification by one skilled in the art based on the sensors and the sensor systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:

an element section including a first base and a first element, the first element including a first fixed member fixed to the first base, a first connecting member supported by the first fixed member, and a first film portion supported by the first connecting member, a first gap being provided between the first base and the first film portion, the first film portion including a first resistance layer, a first conductive layer, and a first conductive member, the first resistance layer not overlapping the first conductive layer in a first direction from the first base to the first fixed member, the first conductive member overlapping the first resistance layer and the first conductive layer in the first direction, a first electrical resistance of the first resistance layer being configured to change according to a state of a detection target around the first element.

2. The sensor according to claim 1, wherein in a state in which a temperature of the first film portion is raised by a first electric power supplied to the first conductive layer, the first electrical resistance is configured to change depending on the state of the detection target.

3. The sensor according to claim 2, further comprising:

a controller, the controller being configured to supply the first electric power to the first conductive layer, and the controller being configured to output a signal corresponding to the first electrical resistance.

4. The sensor according to claim 3, wherein a first conductive layer current through the first conductive layer in a supplying the first electric power is larger than a first resistance layer current flowing through the first resistance layer in a detecting the first electrical resistance.

5. The sensor according to claim 3, wherein the element section further includes a second base and a second element, the second element includes a second fixed member fixed to the second base, a second connecting member supported by the second fixed member, and a second film portion supported by the second connecting member, a second gap is provided between the second base and the second film portion, the second film portion includes a second resistance layer, and the controller is configured output a value corresponding to a difference between a second electrical resistance of the second resistance layer and the first electrical resistance.

6. The sensor according to claim 1, wherein the first electrical resistance changes according to the state of the detection target between the first base and the first film portion.

7. The sensor according to claim 1, wherein a distance between the first base and the first resistance layer along the first direction is shorter than a distance between the first base and the first conductive layer along the first direction.

8. The sensor according to claim 1, wherein a distance between the first base and the first resistance layer along the first direction is substantially the same as a distance between the first base and the first conductive layer along the first direction.

9. The sensor according to claim 1, wherein the first film portion further includes a first other conductive member, the first other conductive member overlaps the first resistance layer and the first conductive layer in the first direction, and the first resistance layer and the first conductive layer are provided between the first conductive member and the first other conductive member.

10. The sensor according to claim 1, wherein the first conductive member is electrically connected to the first base.

11. The sensor according to claim 1, wherein a first base potential of the first base is substantially the same as a potential of the first conductive member.

12. The sensor according to claim 1, wherein an electrical resistance of the first conductive layer is lower than an electrical resistance of the first resistance layer.

13. The sensor according to claim 1, wherein at least one of the first conductive layer or the first resistance layer includes at least one selected from the group consisting of Au, Al, Ti, TIN and Pt.

14. The sensor according to claim 1, wherein a part of the first conductive member overlaps the first conductive layer and the first resistance layer in the first direction, and another part of the first conductive member does not overlap the first conductive layer and the first resistance layer in the first direction.

15. The sensor according to claim 1, wherein in a plane crossing the first direction, at least a part of the outer edge of the first conductive member is outside the first conductive layer and the first resistance layer.

16. The sensor according to claim 1, wherein the first connecting member extends along a second direction crossing the first direction, and a first connecting member width of the first connecting member in a third direction crossing a plane including the first direction and the second direction is narrower than a first film portion width of the first film portion in the third direction.

17. The sensor according to claim 1, wherein the first element further includes a first other fixed member fixed to the first base, and a first other connecting member supported by the first other fixed member, the first other connecting member supports the first film portion, and a first conductive layer wiring electrically connected to the first conductive layer passes through the first connecting member and the first other connecting member.

18. The sensor according to claim 1, wherein the first element further includes a first resistance fixed member fixed to the first base, a first resistance connecting member supported by the first resistance fixed member, a first other resistance fixed member fixed to the first base, and a first other resistance connecting member supported by the first resistance fixed member, the first resistance connecting member and the first other resistance connecting member support the first film portion, and a first resistance layer wiring electrically connected to the first resistance layer passes through the first resistance connecting member and the first other resistance connecting member.

19. The sensor according to claim 1, wherein the first element further includes a first conductive fixed member fixed to the first base, and a first conductive connecting member supported by the first conductive fixed member.

20. A sensor system, comprising:

the sensor according to claim 1; and a communicator configured to transmit a signal corresponding to the change in the first electrical resistance.

* * * * *